United States Patent
Hartmann et al.

(10) Patent No.: US 8,100,057 B2
(45) Date of Patent: Jan. 24, 2012

(54) METHOD FOR REGULATING THE INK IN A PRINTING PRESS

(75) Inventors: Felix Hartmann, Versmold (DE); Stefan Arthur Budach, Detmold (DE); Harald Heinrich Willeke, Paderborn (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

(21) Appl. No.: 12/737,794

(22) PCT Filed: Aug. 12, 2009

(86) PCT No.: PCT/EP2009/060428
§ 371 (c)(1),
(2), (4) Date: Feb. 17, 2011

(87) PCT Pub. No.: WO2010/020569
PCT Pub. Date: Feb. 25, 2010

(65) Prior Publication Data
US 2011/0132218 A1    Jun. 9, 2011

(30) Foreign Application Priority Data
Aug. 21, 2008 (DE) .......................... 10 2008 041 430

(51) Int. Cl.
*B41F 33/00* (2006.01)
*B41F 31/04* (2006.01)
*G01J 3/46* (2006.01)

(52) U.S. Cl. ................ 101/484; 101/365; 101/DIG. 45; 101/DIG. 47

(58) Field of Classification Search ................... 101/365, 101/DIG. 45, DIG. 47, 483, 484, 485
See application file for complete search history.

(56) References Cited

U.S. PATENT DOCUMENTS

| 5,014,618 | A | | 5/1991 | Zingher et al. |
| 5,530,656 | A | | 6/1996 | Six |
| 5,870,529 | A | * | 2/1999 | Kistler et al. ................... 358/1.4 |
| 5,884,562 | A | * | 3/1999 | Sugiyama et al. ............ 101/484 |
| 5,967,049 | A | * | 10/1999 | Seymour et al. .............. 101/484 |
| 6,373,964 | B1 | | 4/2002 | Geissler et al. |
| 6,446,555 | B1 | | 9/2002 | Schramm et al. |
| 6,742,452 | B2 | * | 6/2004 | Mayer et al. ................... 101/365 |

(Continued)

FOREIGN PATENT DOCUMENTS
DE    80046    2/1971
(Continued)

*Primary Examiner* — Leslie J Evanisko
*Assistant Examiner* — Leo T Hinze
(74) *Attorney, Agent, or Firm* — Mattingly & Malur, P.C.

(57) ABSTRACT

The ink in a printing press, in which a stock of material is being printed in an ongoing printing process, is registered. At least one ink is applied to the stock in several inking zones. A measured value, indicating an ink density, is determined for the at least one ink which is being applied to the stock in the printing process and within the printing press. A relation is formed between the measured ink density for a specific ink in a selected ink zone and a measured ink density value determined for the same ink in at least one other inking zone. The relation between the measured ink density values in different inking zones is formed only if the majority of the inking zones of a specific inking unit of the printing press supply one respective measured ink density value for an ink supplied by that inking unit, and when the measured ink density value reaches at least a predetermined fraction of a preset, desired value in the respective inking zone.

40 Claims, 4 Drawing Sheets

U.S. PATENT DOCUMENTS

| | | |
|---|---|---|
| 6,983,695 B2 | 1/2006 | Mogi et al. |
| 7,059,245 B2 * | 6/2006 | Mayer et al. .................. 101/365 |
| 7,398,733 B2 | 7/2008 | De Vries et al. |
| 7,464,645 B2 | 12/2008 | Jeschonneck et al. |
| 7,551,775 B2 | 6/2009 | Tatarczyk |
| 2008/0314268 A1 | 12/2008 | Billmaier et al. |
| 2011/0132221 A1 * | 6/2011 | Hartmann et al. ............ 101/484 |

FOREIGN PATENT DOCUMENTS

| | | |
|---|---|---|
| DE | 3543444 A1 | 10/1986 |
| DE | 3829341 A1 | 3/1990 |
| DE | 4431270 A1 | 4/1995 |
| DE | 102004003612 A1 | 8/2005 |
| DE | 102004021601 A1 | 12/2005 |
| DE | 102008045661 A1 | 4/2009 |
| EP | 0356705 A2 | 3/1990 |
| EP | 0741026 A2 | 11/1996 |
| EP | 1084843 A1 | 3/2001 |
| EP | 1437222 A1 | 7/2004 |
| EP | 2008818 A2 | 12/2008 |
| WO | 2005092613 A2 | 10/2005 |

* cited by examiner

METHOD FOR REGULATING THE INK IN A PRINTING PRESS

CROSS-REFERENCE TO RELATED APPLICATIONS

This application is the U.S. national phase, under 35 U.S.C. 371 of PCT/EP2009/060428, filed Aug. 12, 2009; published as WO 2010/020569 A2 and A3 on Feb. 25, 2010, and claiming priority to DE 10 2008 041 430.1, filed Aug. 21, 2008, the disclosures of which are expressly incorporated herein by reference.

FIELD OF THE INVENTION

The invention relates to a method for regulating the ink in a printing press. The ink regulation is carried out by a control device. A print substrate is printed continuously in an ongoing process of the printing press. At least one ink, which is supplied by an inking unit, is applied to the print substrate in multiple inking zones. A measured value, indicating an ink density of the at least one ink applied to the substrate is determined and a relation is formed between the measured ink density value for a specific ink determined in a selected inking zone and a measured ink density value for the same ink determined in at least one other inking zone.

EP 0 741 026 A2 describes a method for inspecting images and supplying ink to print products of a printing press, wherein actual image data about printed images of the printed products are determined and compared with set image data for the purpose of identifying errors, preferably during online operation, wherein when an error occurs, a check is made prior to an adjustment of ink supply, to determine, on the basis of the nature of the error, whether the cause of the deviation might be something other than ink supply. The method assumes that the printed images of the printed products are divided into imaginary zones according to the zonal division of the inking unit, wherein imaginary separations are made transversely to these zones, resulting in individual fields. Within said fields are measuring points for an optical detection device. One of the steps that is a part of the assessment process involves the comparison of fields of one zone with fields of neighboring zones. Because measuring/control fields can be selected for each zone and for each color, when an error is reported in one zone, the equivalent fields of one or more neighboring zones can be included in the assessment. The expectation is that a color deviation in one zone will be observed in weakened form in neighboring zones.

From WO 2005/092613 A2 a printing press that preferably prints in a multicolor printing process is known, comprising at least one inking unit having a metering device, wherein the metering device of the inking unit is regulated by a control device, wherein the control device is connected to a preferably optical detection device, wherein the detection device uses a sensor oriented toward a surface of a print substrate imprinted in the printing press to detect the quality of the printing.

From EP 1 437 222 A1, a method for printing a print control strip comprising multiple measuring fields is known, wherein the ink densities applied to the individual measuring fields on a print substrate are measured and are used for regulating the ink in a printing press, wherein within the same inking zone, which extends longitudinally in the direction of transport of the print substrate, measuring fields arranged side by side transversely to the direction of transport of said substrate are arranged into three groups of measuring fields, wherein in each group the measuring fields assigned to the inks being used in the print operation are arranged in the same order side by side, wherein in each case a ratio or a difference between an ink density of a specific ink measured in a measuring field of the center group and the two other ink densities of the same ink, each measured in a measuring field of one of the two other groups, is formed, wherein it is ascertained whether the determined ratio or the determined difference is within permissible predefined limits. A result that lies outside of these predefined limits is evaluated as scumming or smearing, for example.

From EP 1 084 843 A1 a device for measuring printed products in densitometric terms is known, wherein measurements obtained from a densitometer measuring head are calculated on the basis of predefined set values and are used as control commands for regulating the ink in a printing press, wherein, using an evaluation unit situated downstream of the densitometer and comprising a computer unit, the ink density values for one measuring field are compared with those of adjacent measuring fields of the same ink and measuring field type (full-tone or halftone).

From DE 10 2004 003 612 A1, a method for evaluating an image of a predetermined section of a printed product is known, in which an image of a predetermined section of the printed product is recorded by a camera using an electronic surface image sensor, in which an image recorded by the image sensor is read out and processed by an electronic evaluation unit, wherein intensity signals recorded from first predetermined fields within the section are linked by calculation to reference data values, which represent a measurement of the intensity of the diffuse light reflected from unprinted regions of the printed product, wherein first an image of a white reference is recorded, and from the intensity signals of said image, basic reference data for the entire section are derived, wherein with each evaluation of an image of the predetermined section, correction data are derived from intensity signals recorded from second predetermined fields within the section, and wherein, before the intensity signals recorded from the first predetermined fields within the predetermined section are linked by calculation to the reference data, the latter are obtained by linking the basic reference data to the correction data by calculation.

From DE 10 2004 021 601 A1 a method for use in a printing press comprising at least one inking unit is known, wherein at least one setting of the relevant inking unit during an ongoing printing process of the printing press, in which a surface of a print substrate is imprinted, can be modified by a control device using at least one measured value acquired during said printing process of the printing press, wherein the control device assesses the plausibility of the acquired measured value before adjusting the setting of the relevant inking unit. To assess the plausibility of the measured values, for example, threshold values for a deviation in the ink density range, for example, are defined, which may not be exceeded by two sequential or spatially adjacent, coincident measured values.

DE 38 29 341 A1 describes a method for acquiring data about a printed image for the purpose of regulating the supply of ink in printing presses, which method uses a densitometer for generating the data, a memory for collecting the data or a spectral photometer and a computer for evaluating the data, in order to control an ink metering device which is divided into zones, wherein the print image is divided into image zones based upon its structure, each zone optionally extending over a different number of zones of the ink metering device, and wherein the image zone data are stored in an image zone memory device, wherein in the image region of each image zone, ink density values are measured by the densitometer or spectral photometer of said zone, wherein the data obtained in this manner are transmitted to the computer, which checks them for completeness and accuracy, wherein if the result of the check is positive, the data are stored in an image data memory device, the densitometer or spectral photometer is cleared for the next measurement, and the next step within a measuring cycle is initiated, or wherein if the result of the data check is negative, an error message is sent and the densitometer is cleared again for the same step in the measuring cycle.

From DE 35 43 444 A1, a method for achieving a uniform print result using an autotypical multicolor printing press is known, in which the supply of inks to adjacent inking zones of a print substrate can be adjusted by means of adjustment elements, and in which, to regulate the printing process, fulltone densities and/or halftone dot sizes in measuring fields imprinted together within the inking zones are repeatedly determined, and if said densities and/or dot sizes fall outside of permissible ranges assigned to them, corrections to the printing process are made by actuating the adjustment elements, wherein to maintain inking equilibrium during the printing process, selected ratios of full-tone densities and/or halftone dot sizes of different inks to one another are also repeatedly determined, and if said selected ratios fall out outside of permissible ranges assigned to them, corrections to the printing process are made by actuating the control elements.

DD 80 046 A1 describes a method for identifying waste copies in rotary printing, wherein one or more photoelectric scanners or illuminating and measuring beams measure the reflective capacity of a non-imprinted area of the paper from one or both sides, wherein this method allows the measuring signal to be used prior to measuring in order to detect unprinted copies or copies having insufficient inking.

SUMMARY OF THE INVENTION

The problem addressed by the invention is that of devising a method for regulating the ink in a printing press, wherein a regulation of ink carried out automatically in an ongoing printing process in a printing press is carried out in only one operating status of the printing press, in which status the active automatic regulation of ink actually makes sense.

The problem is solved according to the invention by the determination of a difference in optical density between adjacent inking zones based on the relation between the measured ink density values determined in the adjacent inking zones in the ongoing printing process. To form the relation, with respect to the selected inking zones, the measured ink density value of that zone is placed in a ratio with a measured value from at least one other inking zone belonging to the same inking unit. The relation between the measured ink density values in different zones is formed only when, in a startup phase of the printing press, the majority of inking zones of a specific inking unit each supply a measured ink density value, which ink density value reaches at least a predefined fraction of a predefined set value in the respective inking zone. The ink regulation, carried out by the control device, is activated only after the above described condition at the end of the startup phase of the printing press has been met.

The benefits to be achieved by the invention consist particularly in that ink regulation performed automatically, i.e., without intervention by press operators, during an ongoing printing process of a printing press is performed while the printing press is in only one operating status in which the active automatic regulation of ink actually makes sense. The solution defines a condition in which automatic ink regulation is performed. Because active automatic ink regulation does not make sense in every operating status of the printing press, for example, during the initial minutes of start-up of the printing press, when the ink transfer process is first building up. This condition is preferably defined prior to the printing process. It can preferably be assigned any parameters and can preferably be stored in a control device that controls the inking unit. In addition, a relation is formed, for example, which is used to check the plausibility of at least one measured value, acquired in the printing press, for the ink density of an ink, determined in a selected inking zone, in relation to the respective measured ink density value for the same ink, determined in another inking zone, wherein said inking zones are preferably arranged side by side, transversely to the direction of transport of the print substrate. Preferably only those measured values which are plausible within the context of other measured values determined for the same printing ink are used for regulating ink, which helps to prevent short-term, isolated disruptions from unnecessarily destabilizing the regulating action of the control device used to regulate the ink. The control device that controls the inking unit checks at least one of the aforementioned relations, formed from measured values each indicating an ink density, for any changes, for example, electronically and/or by means of a program, during the ongoing printing process of the printing press. The plausibility check of said measured value and the subsequent selective use of the relevant measured value for ink regulation, which are preferably performed continuously during the ongoing printing process of the printing press, contribute substantially to a stable control action of the control device that controls the inking unit, contributing to high-efficiency production of high quality printed products, and helping to prevent unnecessary interruptions in print operation.

BRIEF DESCRIPTION OF THE DRAWINGS

One embodiment example of the invention is illustrated in the set of drawings and will be specified in greater detail in what follows.

The drawings show.

DESCRIPTION OF THE PREFERRED EMBODIMENT

Figure 1:
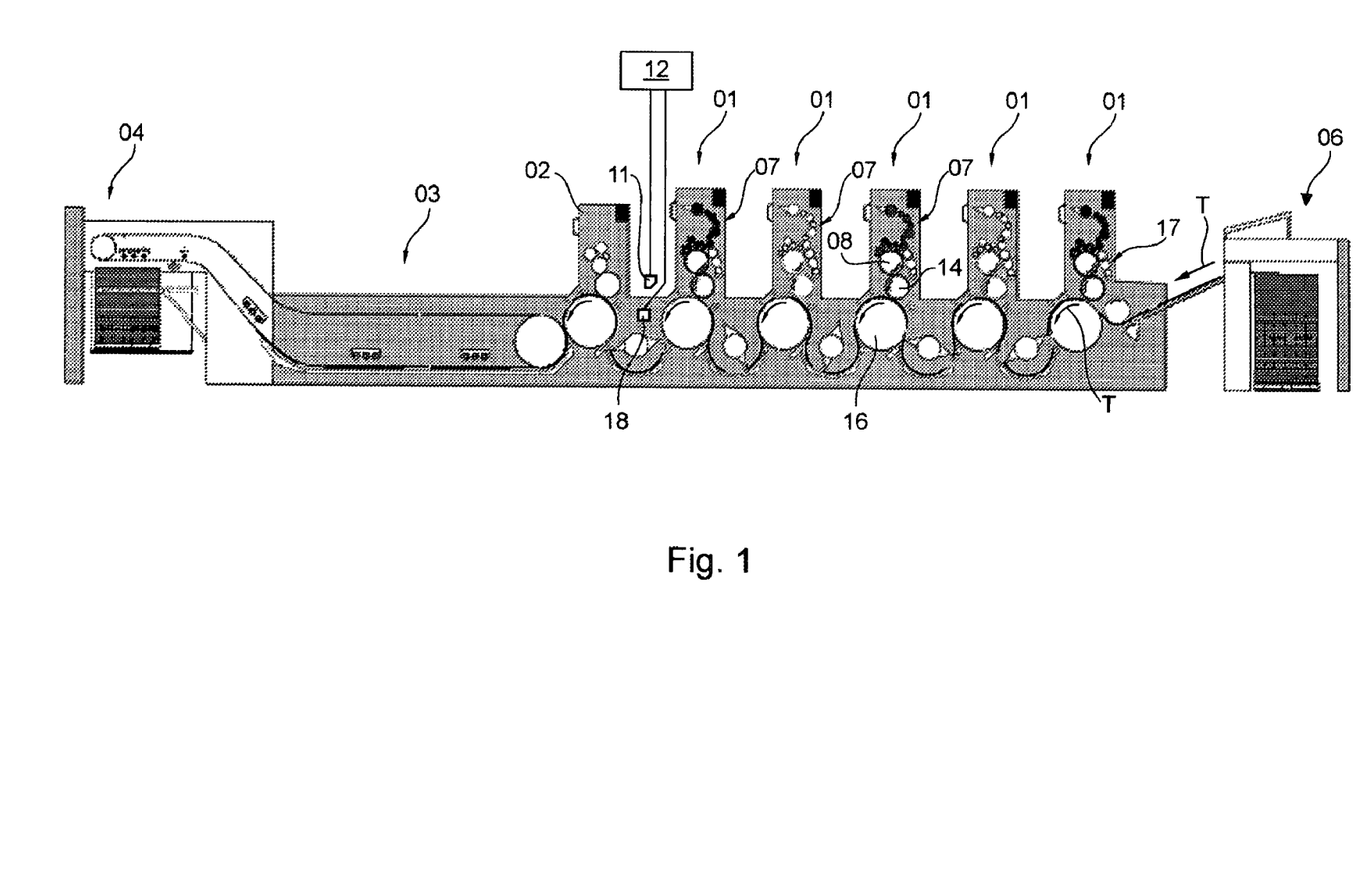
FIG. 1 a simplified illustration of a sheet-fed offset printing press.

FIG. 1 shows a printing press, embodied by way of example as a sheet-fed printing press. Alternatively, however, the printing press can also be embodied as a web-fed printing press. The printing press is particularly embodied as an offset printing press, wherein the printing press is able to print using a conventional or a waterless offset printing process, i.e. a process that prints without the addition of a dampening agent.

The printing press preferably has a plurality of printing couples 01, each of which imprints the same print substrate 09 (FIG. 2) with an ink, for example, in one of the colors black, cyan, magenta or yellow. In the example of FIG. 1, five printing couples 01 are provided in a linear arrangement, one in front of the other, in a direction of transport T of the print substrate 09 indicated by the arrow, wherein each of said printing couples 01 has, for example, at least one forme cylinder 08 which interacts with a transfer cylinder 14. Each forme cylinder 08 is assigned an inking unit 07 which applies ink to the forme cylinder 08. Downstream of the printing couples 01 in the direction of transport T of the print substrate 09, for example, are a coating device in the form of a tower coater 02, and a delivery line 03 and a delivery unit 04. At the opposite end of the sheet-fed printing press, a sheet feeder 06 is arranged. The number of printing couples 01 arranged one in front of the other may be lower or higher than in the example shown in FIG. 1. Enlargement up to ten printing couples 01 is easily possible. At least one of the multiple printing couples 01 can be embodied as an imprinter, and therefore in the printing press, flying plate change, i.e., a change of printing formes on a respective forme cylinder 08 of the relevant printing couple 01, can be performed while the printing press is in production printing by removing the relevant forme cylinder 08 from the ongoing printing process. The sheet-fed printing press can also be provided for perfecting printing, i.e., for two-sided printing on the print substrate 09 passing through the sheet-fed printing press, and can have a turning device, for example, for implementing this function. The imprinter function can be intended for perfecting printing, i.e., for two-sided printing of the print substrate 09. Imprinter-capable printing units 01 can also be used for printing spot colors or special colors. As an alternative to arranging the printing couples 01 in a linear configuration, an arrangement in the form of a tower with a substantially vertical guidance of the print substrate 09 can be provided. Frequently, the darker inks, such as black or cyan, for example, are printed first in the direction of transport T of the print substrate 09, before the brighter inks, such as yellow or magenta, for example, are applied.

Depending upon the type of printing press that is used, the print substrate 09 is material in the form of sheets 09 or a material web, each preferably consisting of a material produced from comminuted plant fibers, and each classified, based upon its application and its base weight, as one of the product types paper (<150 g/m$^2$), paperboard (150 to 600 g/m$^2$) or cardboard (>600 g/m$^2$). A sheet 09 can be more than 1,000 mm in size lengthwise along its direction of transport T (FIG. 4) through the printing press, for example, and more than 700 mm in size transversely to its direction of transport T, for example. A web of material can also be more than 1,000 mm in width, lengthwise along its direction of transport T through the printing press, for example. In web-fed printing, widths of up to 2,600 mm, for example, are realized.

To improve the printability of the print substrate 09, the surface of a print substrate 09 consisting particularly of paper can be coated on one side or on both sides, i.e., provided with a white coating, applied in a single layer or multiple layers and comprised of pigments, binding agents and auxiliary substances, such as optical brighteners, which purposely influence the surface of the print substrate 09 with respect to its brightness, its shade and/or its structure or roughness resulting from its production. The base weight of the coating in this case ranges, for example, from 5 to 20 g/m$^2$, preferably from 5 g/m$^2$ to 10 g/m$^2$. Once the surface of the print substrate 09 has been coated, the surface of the print substrate 09 may be calendered i.e., glazed, in a calender, which also influences the optical properties of the print substrate 09 and its printability. Print substrate 09 to be used as banknote paper or official document paper, for example, can also have a stamped or embossed structure on its surface, with this structure being embodied as flat or as a relief, for example.

As the print substrate 09 passes through the printing press, it is unavoidably influenced by moisture from the surrounding air, from ink applied to its surface, or from dampening agent supplied to the printing process, or by mechanical forces. Depending on the quality of the substrate, these factors cause different degrees of expansion of the substrate surface transversely and/or longitudinally in its direction of transport T through the printing press, wherein expansion is distinguished as wet expansion and/or mechanical expansion, depending on its cause. These effects on the print substrate 09 influence its printability.

In most printing cases, multiple inks are used, which combine in an overprinting of multiple color segments in an autotypical color mixing process to form a multicolor print image 21 (FIG. 2), wherein each color segment prints only one of the inks involved in printing onto the print substrate 09. Frequently, magenta, cyan and yellow inks are used as primary inks, which are mixed to form a plurality of other colors. To reduce the technological expense of producing black or a gray shade as a mixture of the three aforementioned colored inks, thereby saving on costly colored inks, black ink is also used in most cases. In addition, one or more special inks can also be printed, in order to produce a customer-specific color or effect in the printed product. In this, the colorimetric properties of the inks used in printing, combined with the quality of the print substrate 09 to which the inks are applied in the printing press, substantially influence the range of colors that can be reproduced in printing. The colorimetric properties of the inks are also based upon the chemical composition of their color pigments, for example. In most cases, relatively costly color pigments can expand the color space that can be reproduced with an ink, for example. In addition, the color contrast that can be reproduced with an ink is dependent on the print substrate 09 that is used, for example. With coated papers, when primary inks are overprinted for a solid tone, an optical density of about two density units (or 2 D), particularly for black ink, can be achieved.

In the autotypical color mixing process, the multicolor print image 21 is composed by printing color segments, each containing halftone dots, wherein for each ink involved in the printing process one color segment is provided, and the halftone dots of different color segments are applied freestanding, side by side, and over one another to the print substrate 09. The quality of the printing is influenced by the type and the fineness of the halftone screen, i.e., the shaping and arrangement of the halftone dots. In an offset printing process, halftone dots from a size of approximately 10 µm can typically be reliably transferred, wherein in multicolor printing, screen rulings of between 50 and 80 lines per cm are customary. Fine screens for reproducing filigree structures have up to 150 lines per cm, since the finer the halftone screen, the higher the resolution capability of the printing and therefore the reproducibility of fine structures. To avoid moiré, i.e., interference effects or rosette formation, in multicolor printing, it is recommended that the halftone screening be non-periodic. The quality of printing can be further increased by combining a periodic and a non-periodic halftone screen. With a suitable screen angle distance of 15°, for example, for each of the color segments used in printing, moiré can be largely prevented.

Halftone dots can be circular, square or elliptical in shape, for example, and can be arranged in an amplitude-modulated, frequency-modulated or intensity-modulated screen. With amplitude-modulated screening, the individual halftone dots have a constant center point distance but vary in terms of area, whereas with frequency-modulated screening, the individual halftone dots have a constant area with varying center point distances. With intensity-modulated screening, the film thickness of the halftone dots applied to the print substrate 09 is varied, thereby adjusting the optical density of the halftone dots. Combined forms of screening involving multidimensional modulation are possible. In multicolor printing, the positioning of the halftone dots of different color segments involved in the printing in relation to one another and the degree of surface separation of the halftone dots in each of said color segments in the case of overprinted halftone dots influence the quality of the printing. In overprinting, the positioning of color segments in relation to one another is referred to as color register or register.

The physical characteristics of the inks used in printing have a sustained effect on the quality of the printing. The physical characteristics of ink include its rheological behavior, i.e., its flowability, and its adhesion to the print substrate 09 and to halftone dots, at least of a previously imprinted color segment. The flowability of ink is determined by its viscosity. The more viscous an ink is, the thicker it is, and as a result, it does not flow as well and does not spread as well to form a homogeneous film. The adhesion of ink is specified by its tack. The higher the tack of an ink, in the form of a tack value, the harder it is to divide, therefore greater forces are required to transport a film of said ink through an arrangement of rotating bodies, and to transfer it to the print substrate 09, which results in higher frictional resistance and therefore a generation of heat in the printing press.

The viscosity and tack of an ink are dependent on temperature. The production speed of the printing press at which the print substrate 09 is transported through the printing press and which can amount to 18,000 sheets/h for a sheet-fed printing press and 16 m/s in a web-fed printing press, for example, at least indirectly affects the viscosity and tack of the ink. When multiple inks are overprinted, in order for a subsequently printed ink to adhere to a previously printed ink, the subsequent ink must have a lower tack value ("trapping").

The printing press shown in FIG. 1 has at least one detection device 11 with at least one preferably optical sensor 24, in or on at least one of its printing couples 01 (FIG. 3), wherein said sensor 24 is oriented toward a surface of the print substrate 09 imprinted in the printing press and senses at least one measured value that correlates with the quality of the printing. The optical detection device 11 sends preferably digital data resulting from said measured value to a control device 12, whereupon the control device 12 adjusts at least the at least one inking unit 07 on the basis of a difference between a quality of the printing predefined as the set value and the quality of the printing determined as the actual value by the optical detection device 11, so as to minimize the difference between the set value and the actual value, preferably once a permissible tolerance limit has been reached or exceeded. Control exerted by the control device 12 with respect to the ink to be applied by the inking unit 07 to the print substrate 09 is therefore directly dependent on the data that are sent to the control device 12 by the detection device 11.

Each inking unit 07 has a metering device for metering the amount of ink to be transferred to the print substrate 09. Said metering device can have a plurality of zones 22—inking zones 22—, for example, between 30 and 60, or even more (FIG. 2), which are preferably equal in width, arranged side by side in the axial direction of the forme cylinder 08, wherein the metering of the ink to be transferred to the print substrate 09 can be adjusted differently by the control device 12 in different zones 22, and can be corrected if necessary. The metering device can have controllable ink keys, for example, wherein in a printing press that prints using a multicolor printing process, a total of several hundred individually controllable ink keys can be provided. On the basis of a quantity prescribed by the control device 12, the metering device meters an amount of ink to be transferred to the print substrate 09 by adjusting its film thickness and/or its duration of application. Thus the metering device can also be embodied as an ink delivery system, for example an ink injector system, that uses at least one ink pump, wherein ink is supplied to an ink fountain roller of the inking unit 07 and can preferably be metered onto the ink fountain roller in zones by means of adjustment means acting individually on the different inking zones 22, wherein the adjustment means have, for example, an ink metering means, for example, at least one ink blade or one ink lever, which can be driven by at least one electrically actuable actuating drive, wherein the actuating drive is embodied, for example, as a servo motor that can be adjusted by the control device 12. The inking unit 07 can be embodied as an anilox inking unit or as a conventional roller inking unit having more than four rollers in the ink transport path, for example.

In the printing press, the forme cylinder 08 and the assigned transfer cylinder 14 are preferably driven independently of one another, each, for example, by a preferably position-controlled electric drive. Accordingly, the printing press is preferably embodied as shaftless, wherein the drives of the forme cylinder 08 and/or the transfer cylinder 14 are mechanically isolated from a drive of an assigned impression cylinder 16. It can be provided that the forme cylinder 08 and the transfer cylinder 14 are mechanically coupled by toothed gears, for example, and have a shared, preferably position-controlled drive, but that his shared drive is mechanically isolated from a drive of the impression cylinder 16. At least one of said drives can be used to adjust and preferably control a phase position or an angular position of the forme cylinder 08 and/or the transfer cylinder 14 in relation to the impression cylinder 16 or in relation to another forme cylinder 08 of the printing press, wherein the phase position or angular position can be used to adjust a circumferential register. However, even if the forme cylinder 08 is positively coupled to the impression cylinder 14, an actuating drive can be provided for phase adjustment. Circumferential register affects the positioning accuracy of a color segment relative to a reference edge or reference line of the print substrate 09 oriented transversely to the direction of transport T of the print substrate 09. The print substrate 09 is passed between the impression cylinder 16 and a transfer cylinder 14 that interacts with the impression cylinder 16. In addition, each printing couple 01 of the printing press illustrated by way of example in FIG. 1 has a dampening unit 17 that interacts with the forme cylinder 08. The inks printed by at least two printing couples 01 of this printing press onto the same print substrate 09 preferably have different colors from one another.

The optical detection device 11 provided for detecting the quality of the printing is preferably embodied as an inspection system, particularly as an inline inspection system that inspects the print substrate 09 as it is being transported through the printing press. An inspection system expands the functionality of an optical detection device 11 to the extent that, alternatively or particularly in addition to detecting the optical density of an ink applied to the print substrate 09, which can be determined via densitometric means, for example, and/or detecting the color, via colorimetric means, particularly via spectral photometry, and/or detecting the color register occupied by color segments relative to one another, or the circumferential register and/or the lateral register of a color segment, possible disruptions in printing, caused, for example, by the transporting of the print substrate 09 or by the printing process, can also be detected and suitable measures for correcting the disruption or for ejecting the defective printed product can be implemented. Defects detected by an inspection system include, for example, scratch marks, kinks, particles of paper or dirt, ink deposits and hickeys.

The basic function of the optical detection device 11 is preferably to detect, in a contactless manner, an addition of at least one ink involved in the printing onto the print substrate 09 imprinted in the printing press. When at least one ink used in the printing is present on the print substrate 09 imprinted in the printing press at the detection site of the optical detection device 11, the optical detection device 11 detects the presence of the ink by at least one physical characteristic of said ink.

The physical characteristic of the ink can be its color in colorimetric terms, an optical density or a film thickness, a shape, a position, an angle, or an area distribution of its halftone dots applied to the print substrate 09. The optical detection device 11 can also detect, for example, the position of at least one halftone dot of an ink involved in the printing relative to the position of at least one halftone dot of at least one other ink involved in the printing, or the position of at least one halftone dot of an ink involved in the printing in a print image 21 imprinted on the print substrate 09, wherein the former detection option is a relative measurement and the latter detection option is an absolute measurement, i.e., a determination of coordinates of the halftone dot in relation to the print image 21 to be imprinted.

More particularly, if the printing press imprints the print substrate 09 on both sides, i.e., operating as a sheet-fed printing press in perfecting printing, the optical detection device 11 can detect printed images 21 imprinted on opposite sides of the same print substrate 09 and the position of said images relative to one another, i.e., perfecting register. The respective print images 21, each imprinted onto one of the two sides of the print substrate 09, preferably each consist of multiple color segments.

The optical detection device 11 also detects, for example, a physical characteristic of the print substrate 09 imprinted in the printing press. The physical characteristic of the print substrate 09 is particularly a property that affects its printability or its runability. For instance, the physical characteristic of the print substrate 09 can be a wet stretching and/or a mechanical stretching of its surface, transversely to and/or longitudinally along its direction of transport T through the printing press. The physical characteristic of the print substrate 09 can also be an amount of coating applied to its surface, particularly an amount of coating having a coating weight of more than 5 g/m$^2$ applied to the surface of the print substrate 09. The physical characteristic of the print substrate 09 can particularly also relate to the degree of whiteness of its surface.

Figure 2:
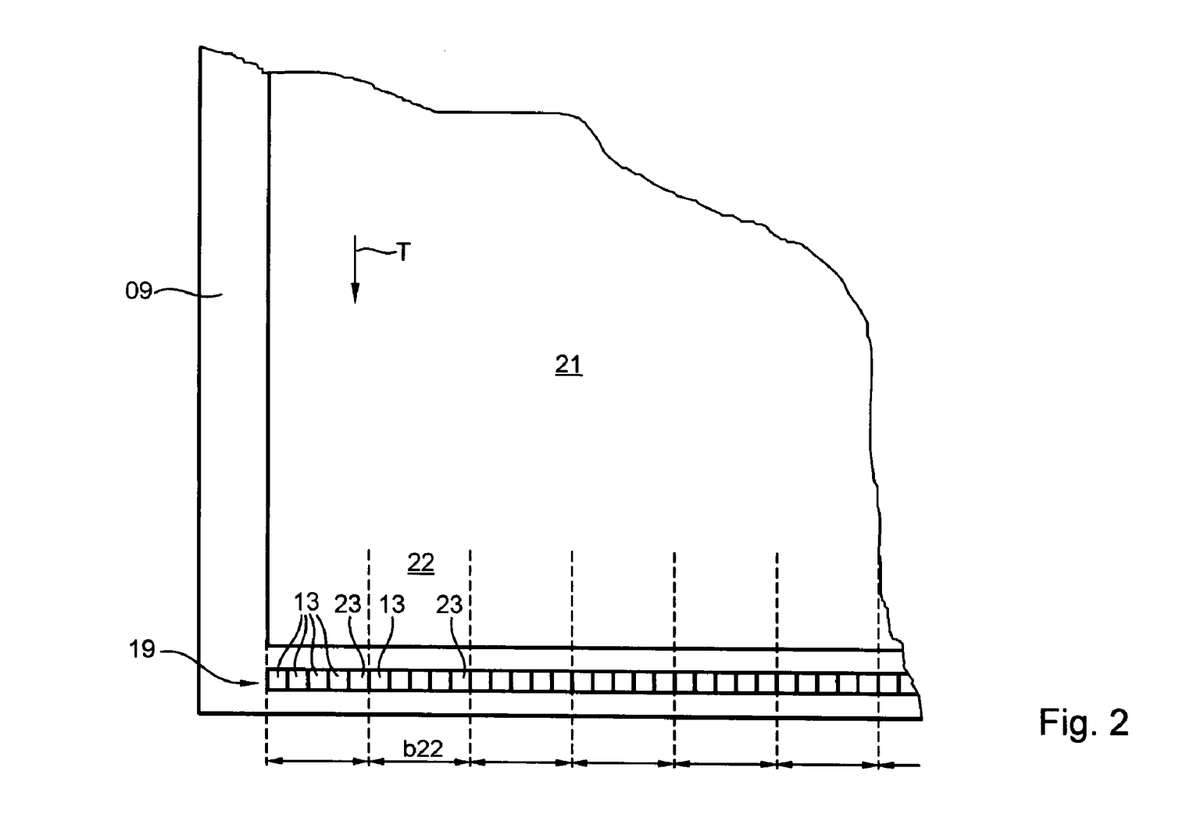
FIG. 2 a section of a sheet with a print control strip.

As is illustrated by the example of a section of a print sheet 09, shown in FIG. 2, the optical detection device 11 detects at least one measuring field 13, wherein each relevant measuring field 13 is assigned to a specific one of the color segments involved in the printing process. The measuring field 13 contains halftone dots of at least one ink, and is embodied, for example, as a full-tone field assigned to the relevant color segment. The measuring field 13 can be a component of a print control strip 19, preferably arranged outside of a type area of the print image 21 imprinted onto the print substrate 09, wherein the print control strip 19, which extends linearly, for example, in the axial direction of the forme cylinder 08, comprises multiple preferably similar groups, for example, of five fields each, for example, arranged side by side in a row, wherein in each group, one measuring field 13, embodied as a full-tone field, for example, is provided for each of the inks black, cyan, magenta and yellow, along with an unprinted white field 23. Each measuring field 13, preferably embodied as a square, along with the white field 23, has a 6×6 mm format, for example. A group consisting of four measuring fields 13 along with the white field 23, arranged side by side, thus extends over 30 mm, for example, in the axial direction of the forme cylinder 08, wherein this extension corresponds, for example, to the width b22 of one of the inking zones 22 of the metering device of the inking unit 07. An aforementioned group consisting of four measuring fields 13, along with the white field 23, side by side, for example, is arranged in each of the inking zones 22 of the metering device of the inking unit 07.

The detection device 11 can particularly be embodied to comprise an optical device, for example, an objective, such that it completely scans at least the width of the ink segment extending transversely to the direction of transport T, preferably even the width of the print substrate 09 extending transversely to the direction of transport T. The detection device 11 is preferably positioned downstream of the last printing couple 01 in the direction of transport T of the print substrate 09 in the printing press. In a sheet-fed printing press operating in a perfecting printing process, the detection device 11 is positioned upstream of a turning device for the print substrate 09. The detection device 11 preferably provides at its output digital data, particularly image data, corresponding to the detection by its sensor 24, which data are received and evaluated by the control device 12 that is connected to the detection device 11.

The sensor 24 of the detection device 11 is preferably embodied as an image sensor 24. The detection device 11 can have multiple sensors 24, even multiple image sensors 24. The sensor 24 is embodied, for example, as a photodiode, and the image sensor 24 is embodied as a CCD chip or as a CMOS chip, for example. The sensor 24 preferably senses multiple colors, particularly simultaneously. The sensor 24 of the detection device 11 is a line camera or a surface camera, for example.

An illumination device 18 is preferably functionally connected to the detection device 11, and also to the control device 12. The illumination device 18 can radiate continuous or pulsed light, and can be embodied, for example, as a cold light source, i.e., as a light source with a very low or practically non-existent infrared portion in its light. The light from the illumination device 18 is provided by multiple light-emitting diodes or laser diodes, for example. It is advantageous to provide a cooling device particularly for the lamp in the illumination device 18. The cooling device can cool the lamp using a gaseous or liquid coolant. The illumination device 18 may consist of multiple modules that can be arranged adjoining one another in a row, to allow easier adaptation to a width of the measuring field 13, the color segment, or the print substrate 09, which is to be scanned and which is oriented transversely to the direction of transport T of the print substrate 09.

The illumination device 18 is preferably positioned close to the transfer cylinder 14 that transfers ink to the print substrate or close to the impression cylinder 16. In a sheet-fed printing press, the illumination device 18 is positioned, for example, below a walkway downstream of the last printing couple 01 in the printing press. The illumination device 18 is spaced a distance of between 30 mm and 200 mm, for example, preferably between 80 mm and 140 mm, from the surface of the imprinted print substrate 09, whereas the sensor 24 of the detection device 11 is spaced a distance of between 10 mm and 1,000 mm, preferably between 50 mm and 400 mm, from the print substrate 09. The distance between the illumination device 18 and the surface of the imprinted print substrate 09 is chosen such that a uniform, intensive illumination of the surface of the print substrate 09 occurs, but soiling of the illumination device 18 by particles of dirt that become swirled into the air or by misted ink during transport of the print substrate 09 can be largely prevented.

Because the control device 12 regulates the ink to be applied by the inking unit 07 to the print substrate 09 on the basis of the data that are supplied to the control device 12 by the detection device 11, the measured values acquired by the detection device 11 must be unadulterated and reliable, as unrecognized, adulterated measured values will inadvertently lead to undesirable regulating behavior by the control device 12, which is detrimental to the desired printing quality in the production process. Therefore, to improve the stability of ink regulation that is performed automatically in an inline ink regulation process, in which at least one inking unit 07 is adjusted in terms of the respective setting of its metering device during an ongoing production process of the printing press, and if necessary is corrected, it is proposed that the measured values acquired by the detection device 11 be preferably checked continuously for plausibility, and that only measured values that appear plausible be used by the control device 12 for controlling the at least one inking unit 07. The measured values acquired by the detection device 11 can be adulterated, for example, by particles of dirt, by a scumming or smearing of the ink, or by some other disruption occurring during the ongoing production process. Short-term disruptions, which are to be viewed merely as singular, i.e., isolated outliers in the measured values acquired by the detection device 11, should not be allowed to destabilize ink regulation, if at all possible. On the other hand, ink regulation must be sensitive enough to clearly recognize a general deterioration in ink application, and to actively and effectively counteract the disruption by adjusting the metering device of the inking unit 07 accordingly.

Also involved is a method for use in a printing press having at least one inking unit 07, in which at least one setting of the relevant inking unit 07 in an ongoing printing process of the printing press, in which a surface of a print substrate 09 is imprinted, can be modified by a control device 12 on the basis of at least one measured value acquired in said printing process of the printing press, in which the control device 12 checks the acquired measured value for plausibility before modifying the setting of the relevant inking unit 07, for example, in that the control device 12, for example, checks the reflective behavior of the surface of the unprinted print substrate 09 and/or checks the relation of a primary ink density determined at a measuring point, for example, in a measuring field 13, to at least one secondary ink density determined at the same measuring point, i.e., in the same measuring field 13, particularly at the same time, and/or checks an ink density determined in an inking zone 22 of the relevant inking unit 07 for its relation to ink densities determined in at least one adjacent inking zone 22 of the same inking unit 07. Preferably, at least two of the checks for plausibility of the acquired measured value are carried out at the same time by the control device 12. The control device 12 will suspend a pending change to the setting of the relevant inking unit 07 particularly when at least one of the checks for plausibility of the acquired measured value produces a negative result, i.e., the relevant acquired measured value is implausible and should be rejected by the control device 12 and not used for ink regulation. In that case, the control device 12 will issue an acoustic and/or a visual warning, for example, to a control station belonging to the printing press. In this context, it is irrelevant whether the measured value to be checked for plausibility is acquired via densitometric or colorimetric means.

As was described above, the measured value to be checked for plausibility is acquired, for example, with a camera, particularly a line camera. In one preferred embodiment, at least one of the checks for plausibility of the acquired measured value can be assigned parameters for its assessment criteria at the control station belonging to the printing press, for example, and/or at another operating unit that can be connected to the printing press.

In another embodiment of ink regulation, for example, a method for checking the plausibility of at least one measured value determined in a printing press is implemented, in which the measured value indicates an ink density of an ink applied to a print substrate 09 transported through the printing press, wherein a plurality of different inks are applied to the print substrate 09, wherein said inks applied to the print substrate 09 are detected simultaneously by a detection device 11 comprising at least one image sensor 24, wherein the detection device 11 provides electronic, particularly digital image data at its output, wherein said image data are evaluated by a control device 12, particularly an electronic control device, for example, which is connected to the detection device 11, wherein the respective measured ink density values for the multiple inks applied to the print substrate 09 are determined from the image data supplied to the control device 12, particularly using a computer program, i.e., using special filtering and/or calculating processes, wherein the plausibility of the at least one measured ink density value for at least one of the inks, determined in this manner, is checked on the basis of its qualitative and/or quantitative ratio to the respective at least one measured ink density value for at least one of the other inks, determined in the same manner.

As was mentioned above, the control device 12 uses the detection device 11 to additionally or alternatively check the reflective behavior of the surface of the unprinted print substrate 09, for example, in connection with a method for automatically regulating ink in an ongoing printing process of the printing press, wherein the print substrate 09 is printed continuously in the printing process executed with the printing press, wherein a measurement of the reflective behavior of an ink applied by the printing press to the print substrate 09 is evaluated, wherein at least one measured value that represents the reflective behavior of the ink is evaluated in relation to the reflective behavior of the surface of the unprinted print substrate 09, and is used for the purpose of ink regulation, wherein the reflective behavior of the surface of the unprinted print substrate 09 is checked for stability during the ongoing printing process of the printing press, assuming that the material properties of the print substrate 09 used in the relevant printing process remain unaltered, wherein in a control device 12 for ink regulation, a measured value that corresponds to the reflective behavior of the surface of the unprinted print substrate 09 is used as a reference value, wherein during the printing process of the printing press, the reflective behavior of the surface of the unprinted print substrate 09 is measured continuously, wherein the measured values thereby acquired are checked for deviation from the measured value established as the reference value, wherein each measured value that deviates from the reference value is evaluated as improperly applied ink. In this case, measured values that deviate from the reference value are evaluated especially as scumming or smearing. In one preferred embodiment, measured values that deviate from the reference value trigger an interruption of use of an ink regulating process employed in the printing press.

In the practical embodiment, the reflective behavior of at least one unprinted white field 23 belonging to the print control strip 19, for example, is evaluated and checked for stability during the ongoing production process, assuming that the material characteristics of the print substrate 09 used in the relevant production process of the printing press remain unchanged. This is important because if an unstable reference value is derived from the reflective behavior of the white field 23, any measured values coming from other measuring fields 13 and referred to this reference value will produce inaccurate results.

The reflective behavior of the surface of the printed and/or unprinted print substrate 09 is measured using densitometry or colorimetry. When this assessment process is used, the print substrate 09 is preferably imprinted continuously in a printing process executed by the printing press. The reflective behavior of the surface of the unprinted print substrate 09 is preferably measured continuously during the ongoing printing process of the printing press, at multiple different measuring points on the surface of said print substrate 09. For instance, the reflective behavior of the surface of the unprinted print substrate 09 could also be measured in a print image 21 produced on the print substrate 09 by the printing press during the printing process. Alternatively, the reflective behavior of the surface of the unprinted print substrate 09 is measured outside of a print image produced by the printing press during the process of printing on the print substrate 09. As the print substrate 09, a series of sheets 09 are imprinted, for example. The reflective behavior of the surface of the unprinted print substrate 09 is measured in at least one measuring field 13 of a print control strip 19, preferably in multiple said measuring fields 13, produced by the printing press during the process of printing on the print substrate 09. In this case, the reflective behavior of the surface of the unprinted print substrate 09 is measured in a transport direction T for transporting the sheets 09 through the printing press, for example, directly downstream of a sheet gripper. Measured values that deviate from the reference value are evaluated as scumming or as smearing. Therefore, measured values that deviate from the reference value will result in an interruption of the ink regulating process employed in the printing press— triggered, for example, by a signal issued by the control device 12. Once again, measured values that deviate from the reference value will trigger an acoustic and/or an optical warning message, for example, in the printing press and/or at a control station belonging to the printing press. As described above, at least the reflective behavior of the surface of the unprinted print substrate 09 is scanned, for example, by a line camera.

In addition, in a process in which multiple different inks are applied to the print substrate 09, wherein the respective ink density of a plurality of said inks is determined at the same measuring point on the print substrate 09, at least one measured value acquired by the detection device 11 in an ongoing printing process of the printing press, for example, and representing an ink density of one of the inks applied to the print substrate 09 transported through the printing press, is checked for plausibility by checking and monitoring a qualitative and/or quantitative ratio of said at least one measured ink density value for one of the ink densities determined at the relevant measuring point to the respective at least one measured value for at least one of the other ink densities also determined there. At least any relevant measured ink density value, the ratio of which to the at least one other measured ink density value, determined at the selected measuring point, deviates from a predefined reference ratio for the chosen measuring point will be rejected as implausible.

Figure 3:
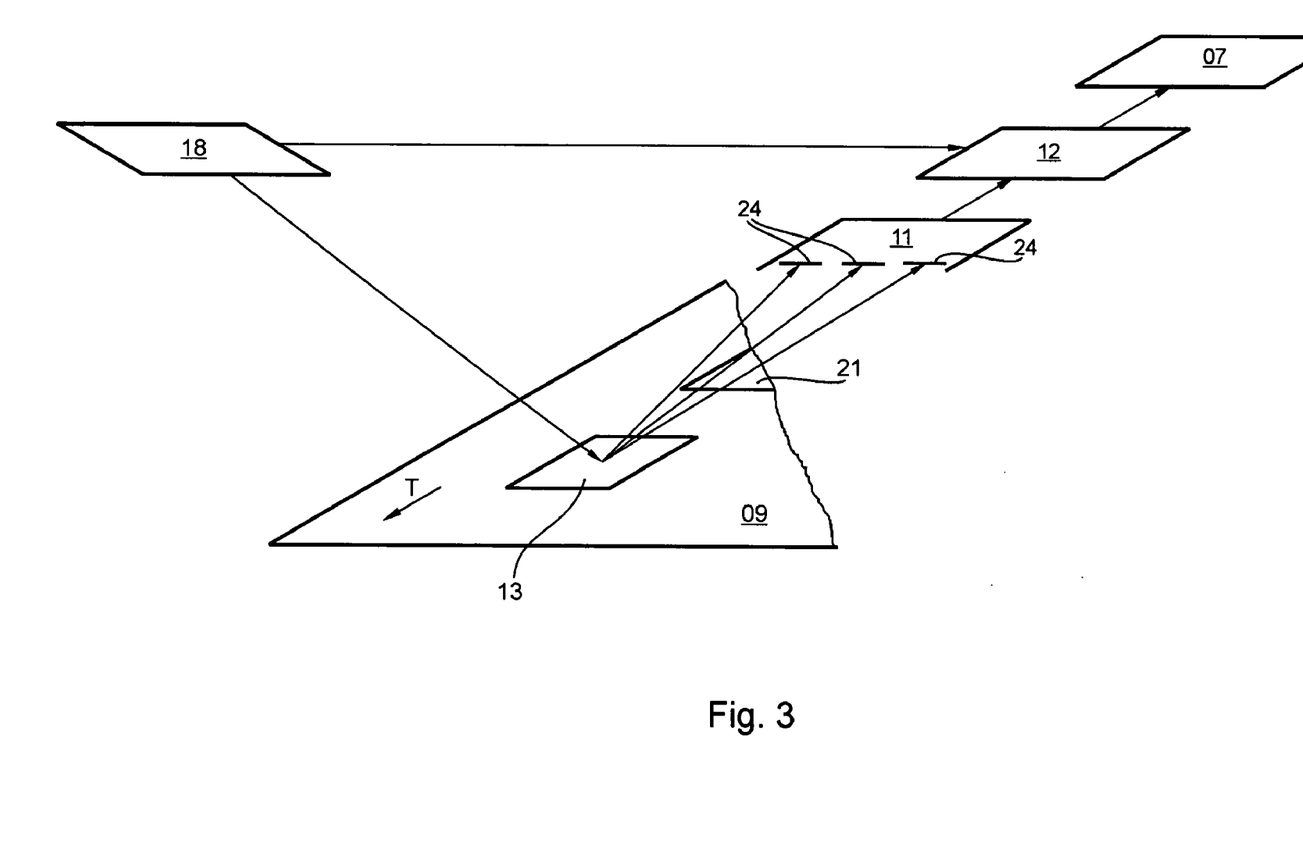
FIG. 3 a schematic illustration of a detection device, with an assigned illumination device, which detects light reflected from a sheet.

As FIG. 3 indicates in the perspective illustration of a section from FIG. 2, the illumination device 18, which is arranged in or on the printing press and interacts with the detection device 11, radiates white light, for example, onto a measuring point on the surface of the print substrate 09 that is imprinted with at least one of the inks, said point consisting, for example, of one of the measuring fields 13 in the print control strip 19. The detection device 11 uses its at least one sensor 24 to detect light reflected from said measuring point. The detection device 11 preferably has a plurality of sensors 24, for example, three, wherein each of said sensors 24 is assigned to the respective reflective behavior of one of the inks printed in the ongoing printing process. Thus, a separate sensor 24 is provided for each of the inks cyan, magenta and yellow, for example, but at least one filter 24 that filters light reflected by the respective ink within a narrow frequency range is provided. The detection device 11 provides at least one measured value at its output, which value indicates the ink density of one of the inks detected at the measuring point. The respective ink densities of the three inks cyan, magenta and yellow, present at the same measuring point, are preferably detected at the same time by the detection device 11. In an ongoing printing process of the printing press, measured values assigned to the respective inks are preferably acquired continuously.

In a measuring field 13 embodied as a full-tone field and assigned to a specific ink, for example, cyan, an ink density for said ink ranging, for example, from 1.3 D to 1.6 D, preferably 1.5 D, for example, is expected. In this measuring field 13, cyan forms a primary ink density or primary density. In the same measuring field 13, however, the respective ink densities of the other inks involved in the same printing process, for example, magenta and yellow, are also determined, and are referred to as secondary ink densities or secondary densities with respect to the selected measuring field 13 assigned to the cyan ink. In this measuring field 13, according to a preset parameter, the secondary density of magenta should not be more than 60% of the primary density, for example, which corresponds to an optical density value of 0.75 D to 1.0 D, for example, whereby in this example, a first reference ratio between the primary density cyan and the secondary density magenta is formed. In this example, the measured value for the secondary density of yellow should not be more than 30% of the primary density, for example, which in this example corresponds to an optical density value of 0.35 D to 0.5 D, for example, whereby in this example a second reference ratio is then formed between the primary density cyan and the secondary density yellow. Similar determinations having different numerical values can then be made for the other primary densities involved in the printing process, with respect to the measuring fields 13 thereof, preferably embodied as full-tone fields 13. The result is an adjustment matrix for all the inks involved in the printing process, for example, to which matrix parameters can preferably be assigned, and which can be input and/or adjusted, for example, at a control station belonging to the printing press and/or in another operating unit that can be connected to the printing press, wherein the respective values for the secondary densities are each represented, referred to the respective primary density, for example.

Only when the measured values for the respective inks, determined in an ongoing printing process, do not exceed the respective predefined relations to one another, that is, their relevant reference ratios, is the measured value determined as the primary density with respect to a specific measuring field 13 considered plausible and thus further usable. A measured primary density value that does not adhere to at least one of the predefined relations will not be used for inline ink regulation, and will instead be rejected by the control device 12, i.e., the control device 12 will not implement a change in the setting of the metering device of the inking unit 07 on the basis of a measured value that does not adhere to at least one reference ratio. Instead, in the case of an implausible measured value, a printing press operator will be notified of this undesirable operating state of the printing press through an optical and/or acoustic message. Inking zones 22 (FIGS. 2 and 4) with inadmissibly high secondary densities can be registered by the control device 12 for later evaluation and determination of the cause of the malfunction.

It is advantageous to implement this method for checking the plausibility of a measured value assigned to a primary density after the printing press has been started up, and only once the measured value has reached, for example, 80% of its expected, predefined or maximum value, and therefore the printing press is no longer in its preprint stage, but is in production printing. The predetermined reference ratio for the selected measuring point is preferably adjustable. This method, which evaluates at least one relation between a primary density and at least one secondary density, allows a determination of the extent to which the usability of an ink involved in the printing process is impaired by scumming, smearing, ink back-trapping in the inking unit 07 or some other form of contamination. The check for plausibility of a determined ink density is performed automatically as part of the ink regulating process used in the printing press, i.e., without input by an operator of the printing press.

A further plausibility check of measured values involves checking a measured ink density value determined in an inking zone 22 of the relevant inking unit 07, selected, for example, by the control device 12, for any change in its relation to a measured ink density value determined in at least one adjacent inking zone 22 of the same inking unit 07. In the inking unit 07 controlled by the control device 12 with respect to the amount of ink provided in the inking zones 22, ink applied by the metering device of said inking unit is generally distributed laterally in the axial direction of the assigned forme cylinder 08 by an oscillating movement of an oscillator arranged in the inking unit 07, evening out the application of said ink, and therefore in a relation between the respective ink densities which is adjusted between adjacent inking zones 22 during production printing of the printing press, only a very small change is expected when the setting of the amount of ink applied in the respective inking zone 22 by the metering device remains unchanged during the ongoing printing process. If the relation between the measured ink density values, determined in adjacent inking zones 22 in an ongoing printing process, changes in an impermissible manner, for example, with a determined difference in optical density between adjacent inking zones 22 of 0.3 D or 0.4 D, without any change in the setting of the metering device during this ongoing printing process, for example, by a control command from the control device 12, this indicates, for example, hickeys or some other type of contamination.

Figure 4:
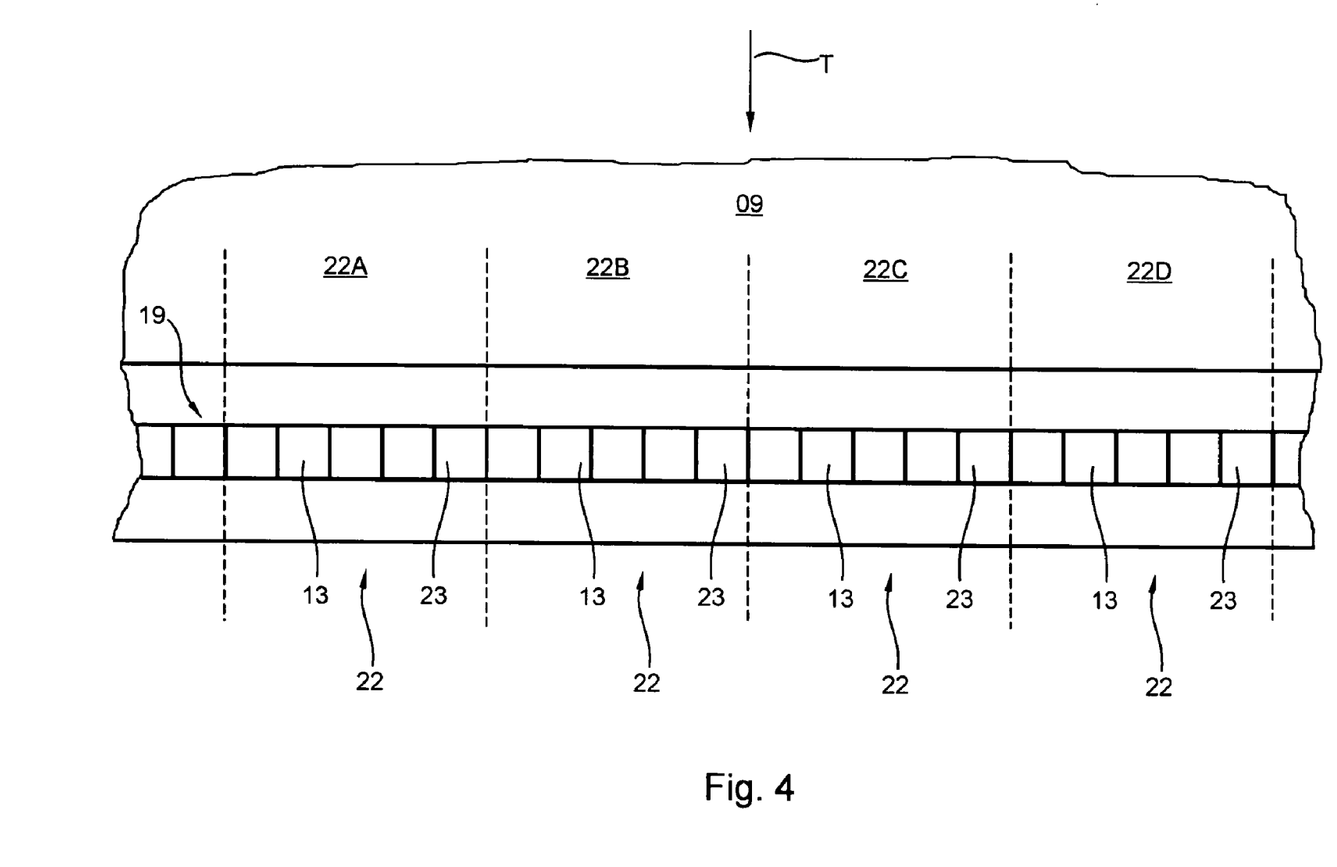
FIG. 4 a sheet with a print control strip and multiple inking zones.

FIG. 4 shows a section of a sheet 09 on which a print control strip 19 extending orthogonally to its direction of transport T is applied (FIG. 2). Multiple inking zones 22, for example, the four inking zones, 22A; 22B; 22C; 22D, illustrated by way of example, extend longitudinally in the direction of transport T of the sheet 09, wherein each inking zone 22A; 22B; 22C; 22D in the print control strip 19 has multiple measuring fields 13 arranged side by side in a row, wherein each of the measuring fields 13 arranged in one of the inking zones 22A; 22B; 22C; 22D, for example, is assigned to a specific ink involved in the printing process and is embodied, for example, as a full-tone field 13. One of the measuring fields 13 arranged in the inking zones 22A; 22B; 22C; 22D can also be embodied as a white field 23 (FIG. 2).

In the example illustrated in FIG. 4, the measured ink density value, determined, for example, in the inking zone 22B in the measuring field 13 assigned to the specific ink, is placed in a relation with the measured ink density value for the same ink, determined in the relevant measuring field 13, for example, in inking zone 22A or 22C. As long as this relation remains within permissible limits, particularly during production printing of the printing press, and the setting of the amount of ink applied by the metering device in the relevant inking zones 22A; 22B; 22C remains unchanged during the ongoing printing process, the measured ink density value, determined in the chosen inking zone 22B for a specific ink, is evaluated as plausible by the control device 12, whereas, when a relation is inadmissibly changed because it exceeds or falls below at least one limit, i.e., a predefined limit, for example, stored in the control device 12, the currently determined measured value will not be used for ink regulation, particularly not for inline ink regulation, wherein ink regulation involves a correction of the setting of the metering device of the relevant inking unit 07. When a relation is inadmissibly modified, the currently determined measured value is rejected by the control device 12 as unusable for ink regulation, particularly for inline ink regulation. For the relevant inking zone 22B, in place of the currently determined measured value, the control device 12 will then obtain a value for the ink density of the relevant ink computationally, via interpolation or extrapolation, on the basis of the measured values determined from the adjacent inking zones 22A; 22C. The formation of relations of the measured values for ink densities between different inking zones 22; 22A; 22B; 22C; 22D is not limited to immediately adjacent inking zones 22A; 22B; 22C, but can also be extended to inking zones 22D that are spaced further from one another, for example, in the same print control strip 19. As a result of this plausibility check, isolated disruptions, i.e., so-called outliers in the measured values, which are not caused by persistent problems in the ink supply, will not activate ink regulation, and therefore will not unnecessarily destabilize the regulating behavior of the control device 12 which carries out ink regulation. Ink is therefore regulated only when there is an actual need for intervention to correct the supply of ink.

In one preferred embodiment, the formation of relations between measured ink density values for different inking zones 22; 22A; 22B; 22C; 22D can be assigned parameters at a control station belonging to the printing press and/or at another operating unit that can be connected to the printing press, i.e., the relation between measured ink density values to be formed between different inking zones 22; 22A; 22B; 22C; 22D can be assigned parameters at a control station belonging to the printing press and/or at another operating unit that can be connected to the printing press. For example, as a prerequisite for forming relations between the measured ink density values for different inking zones 22; 22A; 22B; 22C; 22D, a condition can be adjusted at the control station and/or at the operating unit, for example, using a program mask displayed on a display device, wherein the condition requires that a majority of the inking zones 22; 22A; 22B; 22C; 22D of a specific inking unit 07 supply a measured ink density value for an ink supplied by said inking unit 07, said ink density value reaching at least a predefined fraction of the predefined set value, for example, at least 25%, particularly at least 50% of said set value, in the respective inking zone 22; 22A; 22B; 22C; 22D, i.e., said set value being predefined by the adjustment performed by the control device 12, for example. This can mean that a respective ink density must preferably reach at least half the value of the predefined set value for the respective inking zone 22; 22A; 22B; 22C; 22D in more than 50%, for example, in at least 60%, 70% or 80%, of the inking zones 22; 22A; 22B; 22C; 22D belonging to a specific inking unit 07 before the control device 12 will begin to check a measured ink density value determined in the respective inking zones 22; 22A; 22B; 22C; 22D for plausibility. As a result, the ink regulation carried out by the control device 12 is activated only after the application of ink in the printing process has become sufficiently stable. Accordingly, at least certain parts of a start-up phase of the printing press are disregarded by the control process. However, once the aforementioned condition has been met in the ongoing printing process of the printing press, for example, toward the end of the start-up phase of the printing press, particularly in the production process that follows the start-up phase, the measured ink density value for a selected inking zone 22; 22B is placed in a ratio with a measured value from at least one other inking zone 22; 22A; 22C; 22D belonging to the same inking unit 07 to form a relation, wherein the measured ink density value for the selected inking zone 22; 22B is rejected as implausible when the formed relation deviates by more than 50% from its expected predefined value. An inking zone 22; 22A; 22B; 22C; 22D having a measured ink density value that has been rejected as implausible is preferably registered in the control device 12. In principle, each of the inking zones 22; 22A; 22B; 22C; 22D belonging to a specific inking unit 07 can be selected, wherein the control device 12 can select several or all of said inking zones 22; 22A; 22B; 22C; 22D, either individually in sequence or simultaneously in processes implemented in parallel. To check the plausibility of a measured ink density value in a selected inking zone 22; 22B, measured values from at least two additional inking zones 22; 22A; 22C; 22D, each on one side of the selected inking zone 22; 22B, are considered. Preferably, at least two additional inking zones 22; 22A; 22C; 22D, one on either side of the selected inking zone 22; 22B, are used for this purpose.

All the above described checks of measured values, each of which indicates an ink density, or the relations formed from said values, can be used separately or in any combination in an ink regulator, i.e., in a control device 12 for regulating the ink in a printing press. The ink regulation process can be embodied such that it is initiated only after the application of ink to the print substrate 09 has become stabilized, i.e., a certain percentage of the set value predefined for the ink density of the respective ink has been reached, wherein, this stability check, performed on the basis of set values, can relate to individually selected inking zones 22; 22A; 22B; 22C; 22D, or to a group of selected inking zones 22; 22A; 22B; 22C; 22D. Only those measured values which are obtained by means of a detection device 11, preferably from digital image data, and which are plausible and do not form any outliers caused by merely short-term disruptions, for example, are then used for regulating the ink. Outliers are replaced by the control device 12, for example, with other measured values for the same ink, preferably obtained in adjacent inking zones 22; 22A; 22B; 22C; 22D. The plausibility of the measured values for different inks can also be determined by their respective relations to one another, particularly in reference to a measuring field 13 having a narrowly limited area. In any case, for example, the control device 12 will check whether the respective measured values, acquired inline during an ongoing production process of the printing press, or the relations formed from them remain within certain limits, which are predefined, for example, at a control station of the printing press for a specific production run. If the respective measured values or the relations formed from them exceed or fall below these limits in an impermissible manner, the relevant measured value or the relevant relation that has been checked is rejected as implausible, and will not be used for the ink regulation to be implemented by the control device 12. Additionally, a white value, which results from a check of the unprinted print substrate 09, and to which measured values acquired from the check of colored inks are referred as the zero mark for the respective ink densities thereof, is stable during the ongoing production process, or changes inadmissibly. Overall, using the described method for regulating ink carried out in a running printing press, a highly stable control profile is achieved, which contributes to the production of printed products of high quality in a printing process executed in a printing press.

While a preferred embodiment of a method for regulating the ink in a printing press, in accordance with the present invention, has been set forth fully and completely hereinabove, it will be apparent to one of skill in the art that various changes in, for example, the specific structures of the printing units and their inking units, the drives for the printing units, and the like could be made without departing from the true spirit and scope of the present invention which is accordingly to be limited only by the appended claims.

What is claimed is:

1. A method for regulating the ink in a printing press including:
   printing a print substrate continuously in an ongoing printing process of the printing press;
   applying at least one ink, using a specific inking unit, to the print substrate in multiple inking zones;
   determining a first measured value indicating a first ink density of the at least one ink applied to the print substrate in said printing process in the printing press in a first inking zone;
   determining a second measured value indicating a second ink density of the at least one ink applied to the print substrate in said printing process in the printing press in a second inking zone;
   forming a relation between the first measured ink density value for the specific ink determined in the first inking zone and the second measured ink density value for the same specific ink determined in the second inking zone;
   determining the relation between the first and second measured ink density values determined in the first and second inking zones in the ongoing printing process by one of determining a difference in the ink optical density values between the first and second inking zones, and placing the measured ink density value for the first inking zone in a ratio with the measured ink density value for the second inking zone belonging to the same specific inking unit;
   forming the relation between the measured ink density values in the first and second inking zones only when, during a startup phase of the printing press, the majority of the multiple inking zones of the specific inking unit of the printing press are each supplying a measured ink density value for an ink supplied by said special inking unit, which measured ink density value reaches at least a predefined fraction of a predefined set value in each respective inking zone;
   providing an ink regulation control device; and
   activating the ink regulation carried out by the control device only after the condition that the measured ink density value for an ink supplied by said specific inking unit reaches the at least predefined fraction of the predefined set value in the respective inking zone, at the end of the startup phase of the printing press, has been met.

2. The method according to claim 1 further including applying the ink, the measured ink density values of which are placed in relation to one another, to the print substrate in the multiple inking zones which are arranged side by side, transversely to a direction of transport of the print substrate.

3. The method according to claim 1 further including having the measured ink density values for the ink supplied by the specific inking unit reach at least 50% of the predefined set value for the respective inking zone.

4. The method according to claim 1 further including rejecting the first measured ink density value, determined for the specific ink in the first inking zone by the control device as being implausible when the relation that is formed between said first measured value and the second measured value for the same ink determined in the second inking zone inadmissibly one of exceeds and falls below at least one limit.

5. The method according to claim 4 further including obtaining an ink density value for the relevant ink on the basis of the measured values determined for the at least one other inking zone as a replacement of the first measured ink density value determined in the first inking zone and rejected as implausible by the control device.

6. The method according to claim 5 further including obtaining the ink density value for the relevant ink to be used as a replacement by the control device computationally by one of interpolation and extrapolation.

7. The method according to claim 1 further including rejecting the measured ink density value determined for the specific ink in the selected inking zone as implausible by the control device when said measured value deviates by at least 50% from the measured value determined for the same ink in the at least one other inking zone.

8. The method according to claim 1 further including forming the relation between the measured ink density value for a specific ink determined in the selected inking zone and the measured ink density value for the same ink determined in the at least one other inking zone by selecting one of immediately adjacent inking zones and inking zones that are spaced further from one another.

9. The method according to claim 1 further including using the control device and checking during the ongoing printing process of the printing press, for any changes to the relation between the measured ink density value for a specific ink determined in a selected inking zone and a measured ink density value for the same ink determined in at least one other inking zone.

10. The method according to claim 1 further including using the control device for checking the relation for any change during a production printing of the printing press.

11. The method according to claim 1 further including assigning parameters to the relation between measured ink density values for different inking zones that is to be formed at one of a control station belonging to the printing press and at another operating unit that can be connected to the printing press.

12. The method according to claim 11 further including assigning parameters using a program mask which is displayed on a display device.

13. The method according to claim 1 further including requiring that the ink density must reach at least half the value of the predefined set value for the respective inking zone in more than 50% of the inking zones belonging to a specific inking unit before the control device begins to check a measured ink density value determined in the respective inking zones for plausibility.

14. The method according to claim 1 further including providing that each of the inking zones belonging to a specific inking unit can be selected, and wherein at least one of several and all of said inking zones can be selected by the control device either one of individually in sequence and simultaneously in processes implemented in parallel.

15. The method according to claim 1 further including providing that to check the plausibility of a measured ink density value determined in a selected inking zone, measured values from at least two other inking zones, each located on one side of the selected inking zone, are considered.

16. The method according to claim 1 further including providing that to check the plausibility of a measured ink density value determined in a selected inking zone, measured values from at least two other inking zones, located one on either side of the selected inking zone, are considered.

17. The method according to claim 1 further including regulating an amount of ink supplied to the respective inking zones by using the control device.

18. The method according to claim 1 further including applying multiple different inks to the print substrate in the same ongoing printing process.

19. The method according to claim 18 further including simultaneously detecting said multiple different inks applied to the print substrate by using a detection device having at least one image sensor.

20. The method according to claim 19 further including providing that the detection device provides image data at its output.

21. The method according to claim 20 further including evaluating said image data by the control device that is connected to the detection device, and determining the respective measured ink density values for a plurality of inks applied to the print substrate from the image data supplied to the control device.

22. The method according to claim 21 further including checking the plausibility of the at least one measured ink density value determined in this manner for at least one of the inks on the basis of at least one of its qualitative and/or quantitative ratio to the respective at least one measured ink density value for at least one of the other inks, determined in the same manner.

23. The method according to claim 19 further including simultaneously detecting a plurality of inks applied to the same measuring field by using the at least one image sensor.

24. The method according to claim 23 further predefined reference ratio for a selected measuring field.

25. The method according to claim 24 further including evaluating a ratio between the determined ink densities that deviates inadmissibly from the reference ratio as at least one of scumming and smearing in the selected measuring field.

26. The method according to claim 18 further including checking the plausibility of the respectively determined ink densities of at least three of the inks involved in the ongoing printing process on the basis of their respective ratios to the at least two other determined ink densities.

27. The method according to claim 26 further including rejecting as implausible at least a measured ink density value, the ratio of which to the measured value for the at least one other ink density determined in the selected measuring field deviates inadmissibly from the predefined reference ratio for the selected measuring field.

28. The method according to claim 18 further including using at least cyan, yellow and magenta inks in the ongoing printing process.

29. The method according to claim 1 further including detecting at least the one ink density using a line camera in an ongoing printing process.

30. The method according to claim 1 further including acquiring the measured value to be checked for plausibility via at least one of densitometry and colorimetry.

31. The method according to claim 1 further including providing the printing press for printing in an offset printing process.

32. The method according to claim 1 further including providing the printing press as a press for imprinting sheets.

33. The method according to claim 1 further including modifying, in at least one inking unit of the printing press, a setting of the metering device using the control device on the basis of at least one measured value acquired in said printing process of the printing press, during the ongoing printing process for imprinting a surface of a print substrate.

34. The method according to claim 33 further including using the control device and checking the acquired measured value for plausibility before changing the setting of the relevant inking unit.

35. The method according to claim 34 further including carrying out said plausibility check on the basis of checking the reflective behavior of the surface of the unprinted print substrate and checking a relation between a primary ink density determined in a measuring field on the print substrate and at least one secondary ink density determined at the same time in the same measuring field.

36. The method according to claim 35 further including referencing the primary and secondary ink densities determined in the relevant measuring field to a reference value, which has been defined by the check of the reflective behavior of the surface of the unprinted print substrate.

37. The method according to claim 35 further including carrying out the two checks relating to the plausibility of the acquired measured value simultaneously.

38. The method according to claim 35 further including assigning at least one of the checks relating to the plausibility of the acquired measured value parameters with regard to its assessment criteria at least at one of the control station belonging to the printing press and at another operating unit that can be connected to the printing press.

39. The method according to claim 34 further including using the control device for suspending a pending change to the setting of the relevant inking unit when at least one of the checks relating to the plausibility of the acquired measured value produces a negative result.

40. The method according to claim 39 further including providing that, if at least one of the checks relating to the plausibility of the acquired measured value produces a negative result, at least one of an acoustic and a visual warning message is issued at a control station belonging to the printing press.

* * * * *